United States Patent [19] [11] 3,849,249
Rokugawa et al. [45] Nov. 19, 1974

[54] PRODUCTION OF SYNTHETIC POLYNUCLEOTIDES

[75] Inventors: Kyuji Rokugawa; Yoshiki Katoh; Akira Kuninaka; Hiroshi Yoshino, all of Choshi, Japan

[73] Assignee: Yamasa Shoyu Kabushiki Kaisha, Choshi-shi, Chiba-ken, Japan

[22] Filed: June 29, 1973

[21] Appl. No.: 374,888

[30] Foreign Application Priority Data
July 21, 1972 Japan.............................. 47-72471

[52] U.S. Cl.............................................. 195/28 N
[51] Int. Cl............................................. C12d 13/06
[58] Field of Search................................... 195/28 N

[56] References Cited
UNITED STATES PATENTS
3,796,631 3/1974 Choay et al...................... 195/28 N

*Primary Examiner*—Alvin E. Tanenholz
*Attorney, Agent, or Firm*—Wenderoth, Lind & Ponack

[57] ABSTRACT

Synthesis of plynucleotide, wherein a microorganism belonging to the genus *Achromobacter* is cultivated and then a cultured material such as culture of the microorganism, cells isolated from the culture, or polynucleotide phosphorylase-containing material derived from the cells is caused to contact with at least one nucleoside diphosphate in the presence of one or more kinds of divalent cation.

8 Claims, No Drawings

PRODUCTION OF SYNTHETIC POLYNUCLEOTIDES

This invention relates to a process for producing synthetic polynucleotides such as polyinosinate (hereinafter referred to as "poly(I)"), polyguanylate (hereinafter referred to as "poly(G)"), polyadenylate (hereinafter referred to as "poly(A)"), polycytidylate (hereinafter referred to as "poly(C) "), polyuridylate (hereinfter referred to as "poly(U)"), and various copolymers from nucleoside diphosphates such as inosine diphosphate (hereinafter referred to as "IDP"), guanosine diphosphate (hereinafter referred to as "GDP"), adenine diphosphate (hereinafter referred to as "ADP"), cytidine diphosphate (hereinafter referred to as "CDP"), uridine diphosphate (hereinafter referred to as "UDP"), and a mixture of any of these compounds by the action of polynucleotide phosphorylase produced by a microorganism belonging to the genus *Achromobacter*.

Polynucleotides were synthesized by Ochoa et al. on a limited scale in 1955. Since then, various biochemical activities thereof have been observed. Especially, their interferon-inducing activity promises pharmaceutical uses. However, their economical production on a large scale was quite difficult, because their structures are too complicated to be synthesized chemically, and their enzymatic syntheses are not suitable for industrialization, although it is wellknown that a polynucleotide is synthesized form nucleoside diphosphate (or nucleoside diphosphates) by the action of purified polynucleotide phosphorylase, and that this enzyme is widely distributed in microorganisms.

The polynucleotide phosphorylases so far reported are intracellular enzymes and could not be extracted from cells economically on a large scale. Furthermore, extracted crude enzyme solution known as the source for polynucleotide phosphorylase could not be used for synthesizing a polynucleotide without purification, because it is contaminated by various enzymes which are liable to degrade nucleoside disphosphate as the substrate and/or synthesized polynucleotides. For example, extracts of *Escherichia coli*, *Micrococcus lysodeikticus* and *Azotobacter vinelandii*, which are well-known as sources for polynucleotide phosphorylase, are rich in nucleases and enzymes liable to degrade nucleoside diphosphates. Therefore, the extracts must be highly purified to obtain a polynucleotide in good yield.

To overcome these difficulties, we screened microorganisms suitable for industrial production of a polynucleotide and studied details of condition for the production. As a result, we found that several bacteria which belong to the genera *Pseudomonas*, *Aerobacter*, *Proteus*, *Bacillus*, *Serratia*, *Xanthomonas*, and *Brevibacterium* were rich in polynucleotide phosphorylase, which were easily extractable from cells, and poor in nucleases and enzymes liable to degrade nucleoside diphosphate, and that a polynucleotide was economically synthesized from nucleoside diphosphate (or nucleoside diphosphates) by the culture of the selected strain, the cells, or the material derived from cells without further purification. (vide: 111728)

Further, we have found a surprising fact that microorganisms belonging to the genus *Achromobacter* were extremely rich in polynucleotide phosphorylase, which was easily extractable and fairly stable. This fact is the basis of the present invention.

It is therefore an object of the present invention to provide a method of producing a polynucleotide from nucleoside diphosphate (or nucleoside diphosphates) by the use of a microorganism belonging to the genus *Achromobacter* as the source the polynucleotide phosphorylase.

According to the present invention, there is provided a process for producing a polynucleotide which comprises steps of: cultivating a microorganism belonging to the geuns *Achromobacter:* and contacting at least one nucleoside diphosphate with a cultured material selected from the culture of said microorganism, the cells isolated from the culture, and polynucleotide phosphorylase-containing material derived from the cells, in the presence of at least one divalent cation; manganese or magnesium ion.

The foregoing objects and other objects as well as utility of the present invention will become more apparent from the following detailed description thereof with several preferred examples.

It has not been reported that microorganisms belonging to the genus *Achromobacter* are particularly rich in polynucleotide phosphorylase and suitable for industrial production of polynucleotides. We found that all strains belonging to the genus *Achromobacter* we tested—both type cultures and newly isolated cultures—were rich in polynucleotide phosphorylase. The representative strains are as follows:

| | | |
|---|---|---|
| *Achromobacter* | *cycloclastes* | (ATCC 21921) |
| *Achromobacter* | *delmarvae*, Smart. | (ATCC 21922) |
| *Achromobacter sp.* | KR170-4 | (ATCC 21942) |
| *Achromobacter* | *parvulus*, (Conn) Breed. | (ATCC 4335) |
| *Achromobacter* | *parvulus*, (Conn) Breed. | (NRRL B-2395) |

Of the above representative strains, *Achromobacter sp.* KR170–4 (ATTC 21942) has been isolated from "Kamaboko" prepared in Sendai by the present inventors, the microbial characteristics of which are as follows:

1. Microscopic observations:
   a. Short rods of $0.5 \times 1.5$ microns
   b. Non-motile
   c. Gram negative
2. Observation of the culture
   a. Gelatine colonies:
      circular, raised, glistening, translucent, bluish white, no-liquification
   b. Agar slant:
      abundant growth, filiform, convex, glistening, smooth, translucent, bluish white,
   c. Nitrient broth:
      turbid, pellicle, sediment abundant, white, color of medium unchanged
   d. Gelatin stab:
      moderate growth, no liquification
   e. Potato colonies:
      abundant growth, grayish white, glistening, smooth,
      rised, medium changes from white to smoke-gray 3. Physiological properties
   a. Litmus milk: alkaline, no changed
   b. Indol: not produced
   c. Reductivity in nitrates: reduced to nitrite
   d. Oxygen demand: aerobic
   e. Temperature relations:
      optimum, 25°C, good growth up to 30°C,
slight growth at 0°C
f. Sugar utilization:
Acid but no gas formed from glucose, fructose, galactose, mannose and xylose.
Alkaline reaction and no gas formed from sucrose, lactose, and arabinose.

Most of the above characteristics are very similar to those of *Achromobacter delmarvae* (Bergey's Mannual of Determinative Bacteriology, Seventh Edition, pp. 308, 1957), except that *Achromobacter delmarvae* is described to form acid from lactose, while our strain does not form acid from lactose. Thus, the present inventors named it *Achromobacter* sp. KR170-4.

In the present invention, any kind of polynucleotide can be prepared by selecting suitable nucleoside diphosphate (for nucleoside diphosphates) as starting materials. For example, a homopolymer "poly(I)" is produced when IDP alone is used, and a copolymer "poly (G, C)" is produced when a mixture of GDP and CDP is used as the substrates.

In the latter case, both nucleoside diphosphates should preferably be mixed at an equal ratio of the components constituting the copolymer.

Furthermore, any kind of strains rich in polynucleotide phosphorylase easily extractable from cells can be employed, irrespective of its taxonomical position in the genus *Achromobacter*. Culture of a microorganism is carried out in the usual way in a medium containing adequate carbon source, nitrogen source and minerals. The optimum pH value, aeration, and temperature may be selected for each strain.

Synthesis of a polynucleotide from nucleoside diphosphate (or nucleoside diphosphates) proceeds efficiently irrespective of the form of synthesizing agent. Any form of cultured material selected from among the whole culture, the cells isolated therefrom, and polynucleotide phosphorylase-containing material derived from the cells is effective for synthesizing a polynucleotide. In the case of employing the whole culture, nucleoside diphosphate may be added to the growing culture of a strain together with divalent cation (or cations), if need be, and the incubation is further continued. The added nucleoside diphosphate (or nucleoside diphosphates) is converted into a polynucleotide during the incubation. Nucleoside diphosphate (or nucleoside diphosphates) is usually added at one time, and divisional addition at certain time intervals also produces satisfactory result. In the case of employing the cells, they may be collected by centrifuging the growth culture when the polynucleotide phosphorylase activity reaches its maximum. The maximum was usually observed in the late log phase of the growth. The cells may be suspended in a reaction mixture containing nucleoside diphosphate (or nucleoside diphosphates) divalent cation (or divalent cations), and a buffer or saline, and incubated under appropriate conditions to synthesize a polynucleotide. The concentration and pH of the buffer or saline should be adjusted in the ranges between 0.001 M and 0.3 M and between pH 6 and 12. The optimum condition is usually observed at around 0.1 M and pH 9. The cells may also be replaced by polynucleotide phosphorylase-containing material derived from the cells. For example, ruptured cells, extracts of cells, or polynucleotide phosphorylase preparation partially purified from the extracts can be satisfactorily used as the polynucleotide-phosphorylating-agents. Destruction of the cells is done by various treatments such as ultrasonication, Hughes' press, a cell-lytic reagent, grinding with alumina or quartz sand, or treatment with a highly concentrated sodium chloride solution.

Of the above-mentioned treatments, the one with a highly concentrated sodium chloride has been found to be particularly effective for an industrialized extraction of polynucleotide phosphorylase from large amount of the cells. The collected cells are suspended in a highly concentrated sodium chloride solution (usually saturated solution is employed), allowed to stand for an adequate period (usually overnight), then collected again by centrifugation and resuspended in a buffer or water. By means of the resuspension polynucleotide phosphyrylase is extracted efficiently from the cells into the buffer or water. This extraction can be done more effectively by using a dialysis tube. The collected sodium chloridetreated cells are put into a dialysis tube with a small amount of buffer or water. The tube was soaked in a large amount of the buffer or water. After the dialysis cell-free polynucleotide phosphorylase is recovered from the inner solution of the tube by spinning the cell debris down.

Certain strains (e.g., *Achromobacter parvulus*) contains appreciable amounts of enzymes liable to degrade nucleic acid and/or nucleoside diphosphate in their cells. In such cases, these obstructive enzymes should previously be removed. For example, the extracts are treated with streptomycin to remove nucleic acids, and fractionated by salting-out with ammonium sulfate: Most of the obstructive enzyme activities are removed by precipitating with 0.5 saturated ammonium sulfate, and most of polynucleotide phosphorylase activities are recovered in the fraction precipitating between 0.5 and 0.8 saturation with ammonium sulfate. As a result, one can easily obtain an enzyme solution extremely rich in polynucleotide phosphorylase and poor in enzymes liable to degrade nucleic acid and/or nucleoside diphosphate. Polynucleotide phosphorylase can also be separated from the obstructive enzymes by fractionation with organic solvents. In practice, the polynucleotide phosphorylase-containing material free from the obstructive enzymes can sufficiently be employed without further purification. If necessary, the enzyme can be purified with column chromatography using DEASephadex, etc. The *Achromobacter* polynucleotide phosphorylase is fairly stable, and so, the stability makes it unnecessary to pay close attention to the extraction, purification and incubation processes. At this point, the *Achromobacter* microorganisms are particularly suitable for the industrial production of a polynucleotide.

The present invention covers both methods using a culture of the *Achromobacter* microorganism and those using cells or polynucleotide phosphorylase-containing material derived from them. Usually the reaction is carried out at a temperature range of from 0°C to 60°C, and at pH value of from 6 to 12. Nucleoside diphosphate (or nucleoside diphosphates) remaining at the end of the reaction can be easily recovered from the reaction mixture by a conventional method, and be used as a part of substrates in the next run.

The following Examples are provided for illustrative purposes and may include particular features of the invention, however, the Examples should not be constured as limiting the invention.

Example 1

*Achromobacter cycloclastes* (ATCC 21921) cells were grown with shaking at 28°C for 24 hours in 10 ml of bouillon medium containing 10 % of bouillon powder. The culture was transferred to a 3 *l* Erlenmeyer's flask containing 500 ml of the medium, and incubated with rotary shaking at 28°C for 24 hours. 8 g of the wet cells were harvested from the culture. The cells were suspended in 80 ml of saturated saline solution and allowed to stand overnight. The suspension was centrifuged and the resulted precipitate was resuspended in 16 ml of tap water and dialyzed for 12 hours aginast tap water. To the undialyzable fraction, 6 ml of 10 percent solution of streptomycin sulfate (pH 7.6) was added dropwise with stirring, and precipitate formed was removed by centrifugation. The supernatant was dialyzed against 0.02 M Tris-HC1 buffer (pH 7.6). The inner solution (ca. 25 ml) was employed as a crude enzyme solution.

1.5 g of CDP (sodium salt) and 0.05 g of manganese chloride were dissolved in 100 ml of 0.1 M saline (pH 9.2), and mixed with 15 ml of the crude enzyme solution. The reaction mixture was incubated at 37°C for 6 hours. After incubation, 100 ml of ethanol was added with stirring to the reaction mixture and from the resulted precipitate "poly(C)" was purified by a conventional method. The weight of the finally purified "poly(C)," 5.2 S, was 672 mg (Yield 45 percent)

Example 2

*Achromobacter delmarvae* (ATCC 21922) cells were grown in 1 *l* of the bouillon medium for 14 hours under essentially the same conditions as those employed in Example 1. 17.5 g of the wet cells were harvested from the culture, and 30 ml of crude enzyme solution were obtained by the same method as described in Example 1.

1.5 g of IDP (sodium salt) and 50 mg of manganese chloride were dissolved in 100 ml of 0.1 M HC1 buffer (pH 9.2). The mixture was incubated with 10 ml of the crude enzyme solution at 37°C for 6 hours. After incubation 100 ml of ethanol was added to the reaction mixture. From the precipitate formed, "poly(I)" was isolated and purified by a conventional method. The weight of the purified "poly(I)," 6.9 S, was 760 mg (Yield 51 percent).

Example 3

*Achromobacter delmarvae* (ATCC 21922) cells were grown with shaking at 28°C, overnight in 10 ml of the bouillon medium. 1 ml of the culture obtained was transferred to a Erlenmeyer's flask containing 100 ml of the bouillon medium, and incubated at 28°C for 10 hours. To the culture, powders of 2 g of CDP (sodium salt) and 0.15 g of manganese chloride were added and incubation was further continued. After 48 hours, cells were removed by centrifugation, and 200 ml of ethanol was added to the supernatant. "Poly(C)" was purified from the precipitate formed by a conventional method. 923 mg of the purified "poly(C)," 6.7S, was obtained (Yield 46 percent).

Example 4

*Achromobacter parvulus* (ATCC 4335) cells were grown with shaking at 28°C, overnight in 10 ml of the bouillon medium. The culture was transferred to a 3 *l*-Erlenmyer's flast containing 500 ml of YAMASA Ext. medium (Yamasa Ext. main components thereof: Koji-mold extract 5 percent, Yeast Extract 0.8 percent, pH 7.0), and incubated with rotary shaking at 28°C for 14 hours. 11 g of the wet cells were obtained from the culture, and 30 ml of crude enzyme solution was obtained by the same method as described in Example 1. 10.6 g of powdered ammonium sulfate was gradually added to the ice-colded crude enzyme solution with stirring and precipitate formed was removed by centrifugation.

6.4 g of powdered ammonium sulfate was added again in the supernatnat under the same conditions as above, and precipitate formed was harvested by centrifugation. The precipitate was dissolved in 0.02 M Tris-HC1 buffer (pH 7.6) and dialyzed overnight against the same buffer. The inner solution (3.1 ml) was employed as an enzyme solution.

1.5 g of IDP (sodium salt) and 50 mg of manganese chloride were dissolved in 100 ml of 0.1 M Tris-HC1 buffer (pH 9.2), mixed with 1.5 ml of enzyme solution, and incubated at 37°C for 6 hours. After incubation, "poly(I)" was precipitated from the reaction mixture by adding 100 ml of ethanol. The weight of the finally purified "poly (I)," 6.5 S, was 826 mg (Yield 55 percent).

Example 5

*Achromobacter parvulus* (NRRL B-2395) cells were grown in 1 *l* of the medium under the same conditions as those employed in Example 4. 21 g of wet cells were obtained and 6.5 ml of the enzyme solution was obtained by the ammonium sulfate fractionation as mentioned in Example 4.

1.5 g of IDP (sodium salt) and 50 mg of manganese chloride were dissolved in 100 ml of 0.1 M saline (pH 9.2). The reaction mixture was incubated with 0.8 ml of the enzyme solution at 20°C for 9 hours. From the precipitate formed, "poly(I)" was isolated and purified by a conventional method. The weight of purified "poly(I)," 8.5 S, 584 mg (Yield 39 percent).

Example 6

1.5 g of ADP (sodium salt) and 50 mg of manganese chloride were dissolved in 100 ml of 0.1 M saline. The reaction mixture was incubated at 37°C for 4 hours with the enzyme solution prepared in Example 5. After incubation, 100 ml of ethanol was added to the reaction mixture with stirring. As a result, 870 mg of purified "poly (A)," 6.2 S, was obtained (Yield 58 percent).

Example 7

*Achromobacter sp.* KR170-4 (ATCC 21942) cells were grown in 2*l* of the medium for 10 hours under essentially the same conditions as those employed in Example 4. From the wet cells (32 g), 62 ml of crude enzyme solution was obtained by the method described in Example 1.

15 g of IDP (sodium salt) and 0.5 g of manganese chloride were dissolved in 1 *l* of 0.1 M saline (pH 8.7). The mixture was incubated with 30 ml of the crude enzyme solution at 30°C for 8 hours. After incubation, 1 *l* of ethanol was added to the reaction mixture. From the precipitate formed, "poly (I)" was isolated and purified by a conventional method. The weight of the purified "poly (I)," 9.2 S, was 6.5 g (Yield 43 percent).

Example 8

1.5 g of UDP (sodium salt) and 200 mg of magnesium chloride were dissolved in 100 ml of 0.1 M saline (pH 9.2). The mixture was incubated with 4 ml of the crude enzyme solution prepared in Example 7 at 37°C for 6 hours. After incubation, 100 ml of ethanol was added to the reaction mixture. From the precipitate formed, "poly (U)" was isolated and purified by a conventional method. The weight of the purified "poly (D)," 5.0 S, was 620 mg (Yield 41 percent).

What we claim is:

1. A process for producing a polynucleotide which comprises steps of: cultivating a microorganism belonging to the genus *Achromobacter* and contacting at least one nucleoside diphosphate with a cultured material selected from the culture of said microorganism, the cells isolated from the culture, and polynucleotide phosphorylasse containing material derived from the cells, in the presence of at least one divalent cation selected from manganese and magnesium ions.

2. A process for preparing a polynucleotide as claimed in claim 1, in which the strain of said microorganism is selected from:

| | | | |
|---|---|---|---|
| *Achromobacter* | *cycloclastes* | (ATCC | 21921) |
| *Achromobacter* | *delmarvae* | (ATCC | 21922) |
| *Achromobacter sp.* | KR170-4 | (ATCC | 21942) |
| *Achromobacter* | *parvulus* | (ATCC | 4335) |
| *Achromobacter* | *parvulus* | (NRRL | B-2395) |

3. A process as claimed in claim 1 wherein the nucleoside diphosphate is added to a growing culture of the microorganism together with the divalent cation and the incubation continued.

4. A process as claimed in claim 1 wherein the cells have been collected by centrifuging the growth culture when the polynucleotide phosphorylase activity reaches its maximum.

5. A process as claimed in claim 1 wherein the cells are suspended in a reaction mixture containing the nucleoside diphosphate, the divalent cation and a buffer or saline and suspension incubated.

6. A process as claimed in claim 1 wherein the polynucleotide phosphorylase-containing material is ruptured cells or a crude or partially purified extract from the cells.

7. A process as claimed in claim 6 wherein the polynucleotide phosphorylase-containing material is an extract obtained by suspending the cells in a buffer solution or water after it has been contacted with highly concentrated sodium chloride solutions.

8. A process as claimed in claim 1 wherein the nucleoside diphosphate is contacted with the cultured material at a temperature in the range 0°C to 60°C, and at a pH range 6 to 12.

* * * * *